(12) United States Patent
Ichikawa et al.

(10) Patent No.: US 12,269,704 B2
(45) Date of Patent: Apr. 8, 2025

(54) TRANSPORT MECHANISM AND AIR FLOW CONTROL APPARATUS

(71) Applicant: JAPAN CASH MACHINE CO., LTD., Osaka (JP)

(72) Inventors: Masaaki Ichikawa, Osaka (JP); Hirokazu Arai, Osaka (JP)

(73) Assignee: JAPAN CASH MACHINE CO. LTD., Osaka (JP)

( * ) Notice: Subject to any disclaimer, the term of this patent is extended or adjusted under 35 U.S.C. 154(b) by 554 days.

(21) Appl. No.: 17/595,526

(22) PCT Filed: Apr. 9, 2020

(86) PCT No.: PCT/JP2020/015943
§ 371 (c)(1),
(2) Date: Nov. 18, 2021

(87) PCT Pub. No.: WO2020/241081
PCT Pub. Date: Dec. 3, 2020

(65) Prior Publication Data
US 2022/0297961 A1    Sep. 22, 2022

(30) Foreign Application Priority Data

May 30, 2019    (JP) .................................. 2019-101172

(51) Int. Cl.
*B65G 54/02*    (2006.01)
*B65G 51/04*    (2006.01)
(Continued)

(52) U.S. Cl.
CPC ............. *B65H 5/228* (2013.01); *B65G 51/04* (2013.01); *B65G 54/02* (2013.01); *B65G 54/025* (2013.01);
(Continued)

(58) Field of Classification Search
CPC ...... B65G 54/02; B65G 54/025; B65G 51/04; B65G 51/10; B65H 2701/1912;
(Continued)

(56) References Cited

U.S. PATENT DOCUMENTS 4,805,761 A * 2/1989 Totsch ................... B65G 54/02
198/690.1
5,388,526 A * 2/1995 Imai ..................... B65G 54/025
104/138.1

FOREIGN PATENT DOCUMENTS

JP      S47-044782 A    5/1972
JP      01145922 A  *  11/1987
(Continued)

OTHER PUBLICATIONS

WIPO, Japan Patent Office International Search Authority, International Search Report (with English translation) and Written Opinion mailed Jun. 30, 2020, in International Patent Application No. PCT/JP2020/015943, 15 pages.
(Continued)

*Primary Examiner* — Luis A Gonzalez
(74) *Attorney, Agent, or Firm* — MASUVALLEY & PARTNERS; Peter Martinez (57) ABSTRACT

A banknote transport system 10 includes: an air blowing tube 100 that forms an air flow path 101; a moving body 200 that travels inside the air blowing tube while receiving an air flow within the air blowing tube; a transport path 401 (a transport tube 400) having at least a portion arranged along the air blowing tube to be adjacent to the air blowing tube; and a transport body 500 configured to be able to retain a banknote and traveling inside the transport path. The moving body includes a moving body magnet 213, and the transport body includes a transport body magnet 523. The banknote transport system moves the transport body in conjunction with movement of the moving body receiving the air flow
(Continued)

due to attraction and/or repulsion based on a magnetic force applied between the moving body magnet and the transport body magnet.

7 Claims, 8 Drawing Sheets

(51) Int. Cl.
 *B65H 5/00* (2006.01)
 *B65H 5/22* (2006.01)
 *G07D 11/13* (2019.01)

(52) U.S. Cl.
 CPC .... *G07D 11/13* (2019.01); *B65H 2301/44332* (2013.01); *B65H 2301/4461* (2013.01); *B65H 2701/1912* (2013.01)

(58) Field of Classification Search
 CPC ........ B65H 5/004; B65H 5/228; G07D 11/16; G07D 11/13
 See application file for complete search history.

(56) References Cited

FOREIGN PATENT DOCUMENTS

| JP | S63-201332 U1 | 12/1988 |
|----|---------------|---------|
| JP | 2006-044829 A | 2/2006 |
| JP | 2009-101171 A | 5/2009 |
| JP | 2011-026114 A | 2/2011 |
| JP | 2018-070352 A | 5/2018 |
| WO | WO99/10845 A1 | 3/1999 |

OTHER PUBLICATIONS

Japan Patent Office, Office Action dated Jun. 12, 2020, with English translation in Japanese Patent Application No. JP 2019101172, 8 pages.

* cited by examiner

TRANSPORT MECHANISM AND AIR FLOW CONTROL APPARATUS

RELATED APPLICATIONS

This application is the U.S. National Phase of and claims priority to International Patent Application No. PCT/JP2020/015943, International Filing Date Apr. 9, 2020, entitled Paper Sheet Transport Mechanism And Air Flow Control Apparatus; which claims benefit of Japanese Patent Application Serial No. 2019-101172 filed May 30, 2019 entitled To Provide A Paper Sheet Separating-Carrying Mechanism; and both of which are incorporated herein by reference in their entireties.

FIELD

The present invention relates to a transport mechanism that transports an object to be transported including paper sheet such as banknotes, and more particularly relates to a transport mechanism that moves a moving body that has a magnetic material mounted thereon using an air flow and that moves a transport body that retains the object to be transported using a magnetic force in conjunction with the movement of the moving body.

BACKGROUND

In a game hall where various types of game machines such as pachinko machines or pachislot (pachinko-slot) machines are installed, game media dispensing devices for renting pachinko balls or tokens being game media to players according to a money amount of banknotes input through a banknote inlet are placed adjacent to the game machines. Various banknote transport devices are developed and proposed to enable the game media dispensing devices to safely and smoothly transport received banknotes to a safe.

Patent Literature 1 describes a banknote transport device that includes banknote holding units each temporally holding banknotes received from associated banknote input devices at appropriate places in a game hall bank, and in which a banknote transport unit collets the banknotes held in the banknote holding units to transport the banknotes to a safe. In Patent Literature 1, the banknote transport unit and a drive motor provided on the side of the safe are coupled with a banknote-transport-unit operating band. The banknote transport unit is towed by the banknote-transport-unit operating band to be moved to the safe when the drive motor positively rotates, and moves to a standby position at an end portion of the game hall bank when the drive motor oppositely rotates.

CITATION LIST

Patent Literature

Patent Literature 1: Japanese Patent Application Laid-open No. 2009-101171

SUMMARY

Technical Problem

However, in Patent Literature 1, load applied to the banknote-transport-unit operating band at the time of moving the banknote transport unit is large and it is difficult to smoothly transport banknotes when the transport distance is increased. Furthermore, mechanical driving means such as the drive motor and the banknote-transport-unit operating band are required to move the banknote transport unit in Patent Literature 1. Since components constituting the driving means wear due to contact or friction, the running cost is increased.

The present invention has been achieved in view of the circumstances described above and has an object to provide a novel transport mechanism that can achieve smooth transport of objects to be transported at a low cost.

Solution to Problem

In order to achieve the above object, the present invention comprises an air blowing tube that forms a flow path of a gas, a moving body that travels inside the air blowing tube while receiving an air flow flowing in a predetermined direction within the air blowing tube, a transport path having at least a portion arranged along the air blowing tube to be adjacent to the air blowing tube, and a transport body configured to be able to retain an object to be transported and traveling inside the transport path, wherein the moving body includes a moving body magnetic material, the transport body includes a transport body magnetic material, and at least one of the moving body magnetic material and the transport body magnetic material is a magnet and the transport body is moved in conjunction with movement of the moving body receiving the air flow due to attraction and/or repulsion based on a magnetic force applied between the moving body magnetic material and the transport body magnetic material.

Advantageous Effects of Invention

According to the present invention, a novel banknote transport mechanism that can achieve smooth transport of banknotes at a low cost is provided.

DESCRIPTION OF EMBODIMENTS

The present invention will be described below in detail with embodiments illustrated in the drawings. Constituent elements, types, combinations, shapes, and relative arrangements described in the following embodiments are merely explanatory examples, and are not intended to limit the scope of the present invention solely thereto unless otherwise specified.

An embodiment of the present invention is described below in detail.

[Schematic Configuration of Bank Facilities]

Figure 1:
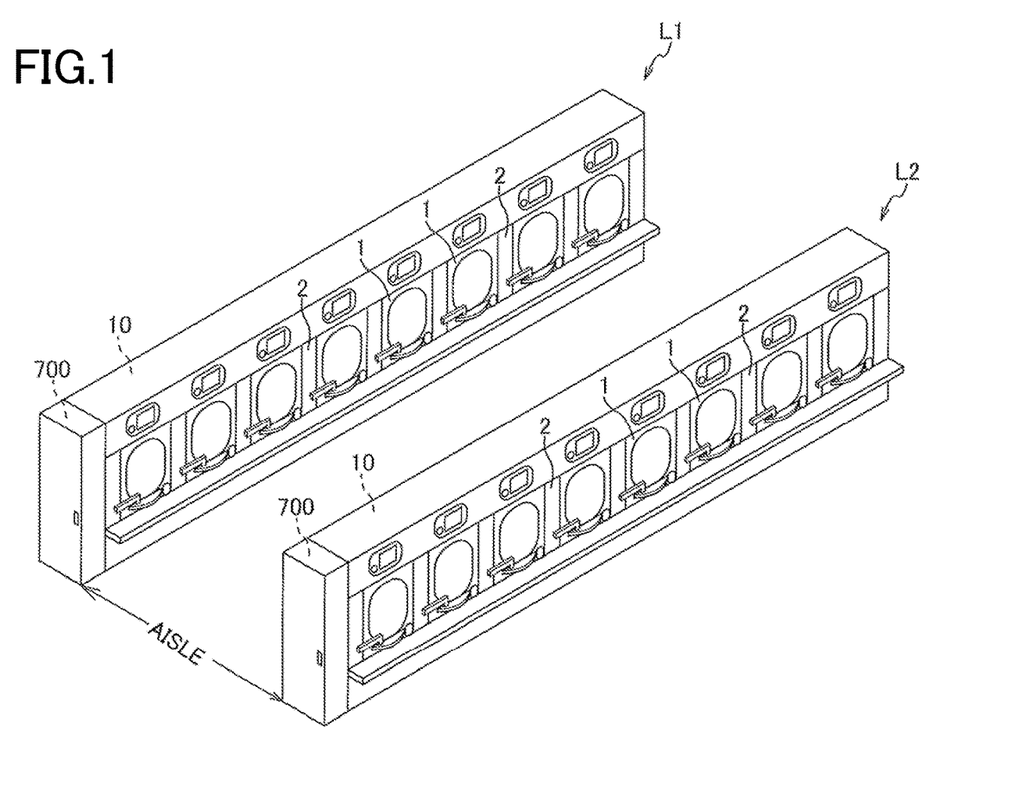
FIG. 1 is a perspective view illustrating a schematic configuration of bank facilities including a plurality of game machines.

FIG. 1 is a perspective view illustrating a schematic configuration of bank facilities including a plurality of game machines.

Game machines 1 are installed on bank facilities L (L1, L2, . . . ) and eight game machines 1 are arranged back to back on each of two opposing side surfaces of each of the bank facilities L, that is, a total of 16 game machines 1 are arranged back to back. An aisle on which players or clerks of the game hall walk is provided between the bank facilities L and a chair (not illustrated) is provided for each of the game machines 1 on the aisles.

A sandwiched machine 2 is installed for each of the game machines 1 on the bank facilities L. The sandwiched machine 2 includes a banknote inlet that receives banknotes, a game media dispensing device that dispenses a number of pachinko balls corresponding to the amount of input money, and the like. A banknote transport system 10 that transports banknotes inserted through the sandwiched machines 2 to a safe unit 700 placed at one end portion of the associated bank facility L is installed in each of the bank facilities L illustrated in FIG. 1.

Figure 2:
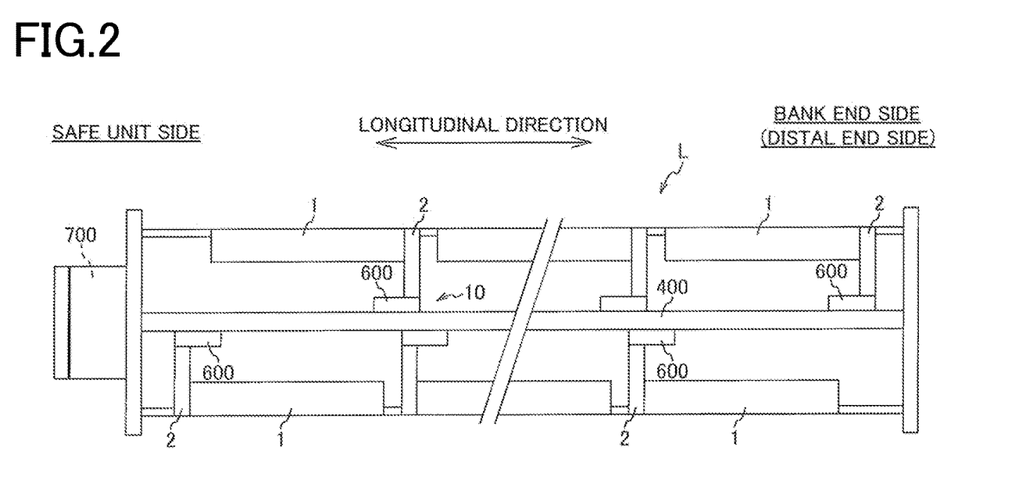
FIG. 2 is a plan view illustrating a schematic configuration of the bank facility including a plurality of the game machines.

FIG. 2 is a plan view illustrating a schematic configuration of the bank facility including a plurality of the game machines.

The banknote transport system 10 installed in each of the bank facilities L includes receiving units 600 that each receive banknotes inserted from the banknote inlet of the associated sandwiched machine 2 therein, a transport tube 400 that extends in a longitudinal direction of the bank facility L (an array direction of the game machines 1) and that transports the banknotes received by the receiving units 600, the safe unit 700 that is arranged at one end of the transport tube 400, and the like.

[Schematic Configuration of Banknote Transport System]

<Overall Outline>

Figure 3:
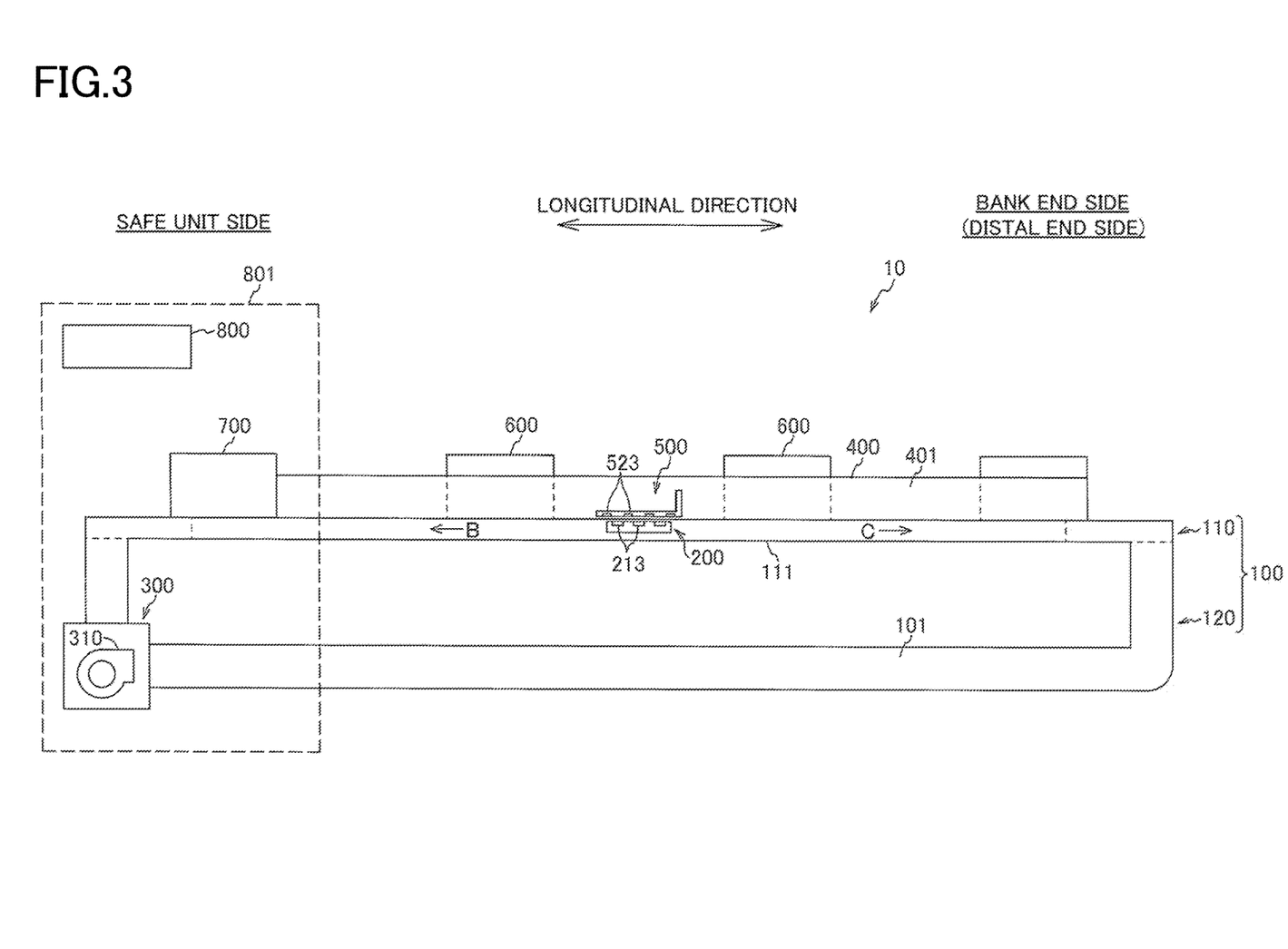
FIG. 3 is a schematic diagram illustrating a schematic configuration of a banknote transport system.

FIG. 3 is a schematic diagram illustrating a schematic configuration of the banknote transport system. The banknote transport system (transport mechanism for transporting objects to be transported such as paper sheet) 10 according to one embodiment of the present invention is characterized in transporting banknotes using an air flow and a magnetic force.

The banknote transport system 10 includes an air blowing tube 100 that forms a flow path (an air flow path 101) of a gas, a moving body 200 that travels (moves) inside the air blowing tube 100 while receiving an air flow flowing in a predetermined direction within the air blowing tube 100, an air-blow control unit 300 that controls the air flow flowing inside the air blowing tube 100, the transport tube 400 (a transport path 401) that has at least a portion arranged along the air blowing tube 100 to be adjacent to the air blowing tube 100, and a transport body 500 that is configured to be able to retain banknotes(objects to be transported, paper sheets) and that travels (moves) inside the transport tube 400 (the transport path 401). The transport tube 400 forms the transport path 401 (a transport route and a transport space) for banknotes.

The moving body 200 includes a moving body magnetic material (moving body magnets 213), and the transport body 500 includes a transport body magnetic material (transport body magnets 523). At least one of the moving body magnetic material and the transport body magnetic material is formed of a magnet.

The banknote transport system 10 includes the receiving units 600 that receive banknotes from outside and keep the banknotes at predetermined locations in the transport tube 400, respectively, the safe unit 700 that includes a banknote accommodating unit that accommodates therein banknotes transported by the transport body 500, and a management unit 800 that controls the components constituting the banknote transport system 10.

In the present example, the air-blow control unit 300 and the safe unit 700 are accommodated in a body 801 that has the management unit 800 accommodated therein.

The banknote transport system 10 is characterized in moving the moving body 200 arranged in the air blowing tube 100 in the longitudinal direction of the air blowing tube 100 with the air flow flowing inside the air blowing tube 100, and in moving the transport body 500 arranged in the transport tube 400 along the longitudinal direction of the air blowing tube 100 with a magnetic force acting between the transport body 500 and the moving body 200. That is, the banknote transport system 10 is characterized in moving the transport body 500 in conjunction with movement of the moving body 200 receiving the air flow due to attraction and/or repulsion based on a magnetic force acting between the moving body magnets 213 and the transport body magnets 523.

<Outline of Components>

The air blowing tube 100 includes a moving route part 111 in at least a portion in the longitudinal direction, on which the moving body 200 travels along the longitudinal direction of the air blowing tube 100. The moving route part 111 is arranged in parallel and adjacently to the transport tube 400.

The moving body 200 moves inside the air blowing tube 100 while receiving an air flow flowing in a predetermined direction within the air blowing tube 100. The moving body magnets 213 mounted on the moving body 200 provide a repelling action and/or an attracting action due to a magnetic force to the transport body 500. The moving body 200 moves the moving body 200 in conjunction with its own movement due to the magnetic force.

The air-blow control unit 300 includes a blower (an air flow generating device) 310 that generates an air flow in a predetermined direction inside the air blowing tube 100. The air-blow control unit 300 alternately generates an air flow in a first direction (a banknote collecting direction and an arrow-B direction) and an air flow in a second direction (a transport body returning direction and an arrow-C direction) being an opposite direction to the first direction inside the air blowing tube 100 to reciprocate the moving body 200 inside the air blowing tube 100.

The transport tube 400 forms a space through which banknotes and the transport body 500 move.

The transport body 500 receives and retains the banknotes kept at predetermined locations in the transport path 401, and moves inside the transport path 401 to transport the banknotes inside the safe unit 700. The transport body magnets 523 mounted on the transport body 500 are subjected to the attracting action and/or the repelling action due to the magnetic force from the moving body magnets 213 included in the moving body 200. The transport body 500 moves inside the transport tube 400 in conjunction with the movement of the moving body 200 receiving the air flow.

When only the attracting force is to be applied between the moving body 200 and the transport body 500, both the magnetic materials mounted on the moving body 200 and the transport body 500 can be magnets, or one of the magnetic materials of the moving body 200 and the transport body 500 may be magnets and the other one may be a magnetic material such as iron. When only the repelling force is to be applied between the moving body 200 and the transport body 500, both the magnetic materials mounted on the moving body 200 and the transport body 500 are formed of magnets.

The receiving unit 600 receives banknotes inserted from the banknote inlet of the associated sandwiched machine 2 therein and keeps the banknotes at a predetermined location in the transport path 401. The receiving unit 600 is provided for each of the sandwiched machines 2. A plurality of the receiving units 600 are installed in the longitudinal direction of the transport tube 400 at a predetermined interval.

The safe unit 700 includes a banknote accommodating part that accommodates therein banknotes transported by the transport body 500, a drive mechanism that drives members related to accommodation of the banknotes in the banknote accommodating part, and the like.

The management unit 800 controls operations of the components constituting the banknote transport system 10. The management unit 800 is configured to include a general computer device that includes a CPU (Central Processing Unit), a ROM (Read Only Memory), a RAM (Random Access Memory), and the like and in which these units are connected via a bus. The CPU is an arithmetic unit that controls the entire bank transport system 10. The ROM is a nonvolatile memory that has a control program to be executed by the CPU, data, and the like stored therein. The RAM is a volatile memory to be used as a work area for the CPU. The CPU reads the control program stored in the ROM to load the control program into the RAM and execute the control program, so that various functions are realized.

[Detailed Configuration of Banknote Transport System]

Detailed configurations of the components of the banknote transport system according to the embodiment of the present invention are explained.

<Air Blowing Tube>

The air blowing tube is explained with reference to FIGS. 3 and 4.

Figure 4:
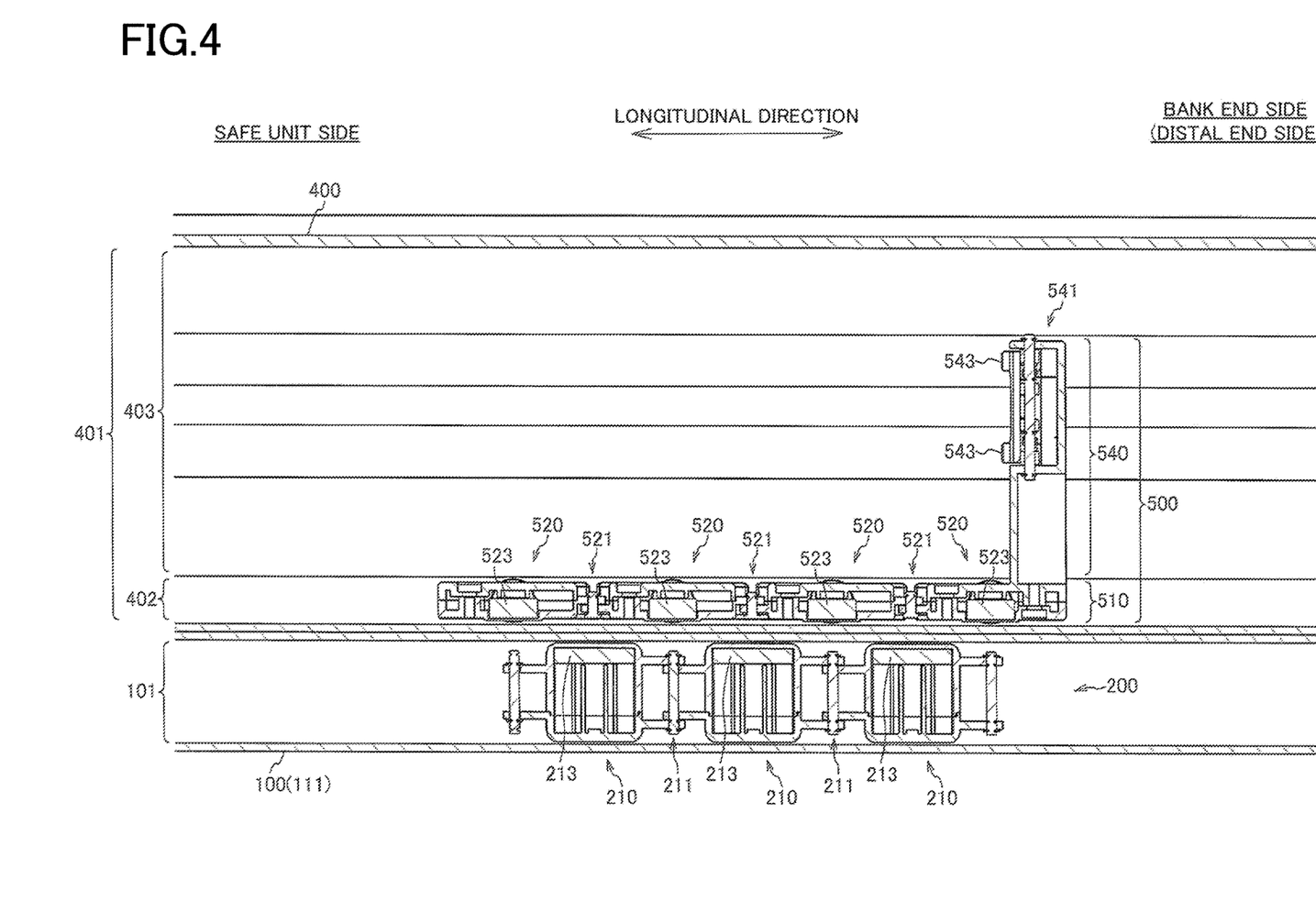
FIG. 4 is a vertical sectional view of a moving body, an air blowing tube including the moving body, a transport body, and a transport tube including the transport body in a case in which the moving body and the transport body repel each other due to a magnetic force.

FIG. 4 is a vertical sectional view of the moving body, the air blowing tube including the moving body, the transport body, and the transport tube including the transport body in a case in which the moving body and the transport body repel each other due to a magnetic force.

The air blowing tube 100 illustrated in FIG. 3 includes a first air blowing tube 110 including the moving route part 111, and a second air blowing tube 120 forming the air flow path 101 in an endless manner with the first air blowing tube 110 through a switching valve 325 (see FIG. 5), which will be described later.

Since the banknote transport system 10 moves the transport body 500 using a magnetic force, the moving route part 111 of the air blowing tube 100 includes a configuration that does not affect the travel of the moving body 200 and the travel of the transport body 500 based on the magnetic force. While it is desirable that the moving route part 111 is entirely formed of a non-magnetic material, the moving route part 111 may include a magnetic material in a portion within a range that does not affect the travel of the moving body 200 and the transport body 500.

The moving route part 111 includes a configuration (the thicknesses of the tube, the spacing between tubes, the shape thereof, and the like) that can apply a magnetic force between the moving body 200 arranged inside the moving route part 111 and the transport body 500 arranged inside the transport tube 400.

With the configuration of the air blowing tube 100 separate from and independent of the transport tube 400, an airtight flow path can be formed in the air blowing tube 100. Reduction in the transport force of the moving body 200 due to air leakage to outside of the air blowing tube 100 can be prevented. Furthermore, the blower 310 being relatively inexpensive and outputting low power can be adopted as a blower to be used to generate an air flow and reduction in the cost of the banknote transport system 10 can be realized. The air flow inside the air blowing tube 100 can be reliably controlled even when the air blowing tube 100 is elongated with an increase in the banknote transport distance. Since the moving body 200 is caused to travel with the air flow, the need to arrange a mechanical configuration such as a gear or a transport belt, lines, or electrical contacts inside the air blowing tube 100 is eliminated and the durability of the air blowing tube 100 and the moving body 200 arranged therein is increased. Furthermore, external air does not flow in the air flow path 101 airtightly configured, so that grit and dust in the external air are not drawn therein and the inside of the air flow path 101 can be kept clean.

<Moving Body>

It suffices that the moving body 200 has a shape that enables movement in the air blowing tube 100 by being subjected to an air pressure.

As illustrated in FIG. 4, the moving body 200 has a configuration in which a plurality of divided pieces 210, 210, . . . are sequentially coupled to each other with hinge parts 211 along a travel direction of the moving body 200 (the longitudinal direction of the air blowing tube 100). The divided pieces 210 illustrated in the present example have same configurations and each of the divided pieces 210 has the moving body magnet 213.

The moving body 200 includes the moving body magnets 213 respectively arranged at locations, in attitudes, and in shapes that enable to apply a magnetic force to the transport body 500. In the present example, the moving body magnets 213 are arranged on a side of the moving body 200 nearer the transport tube 400. The moving body magnets 213 included in the moving body 200 are arranged spaced apart from each other in the travel direction of the moving body 200. In the present example, each of the moving body magnets 213 is attached to the associated divided piece 210 in such a manner that the N pole (one of the poles) faces the side of the transport tube 400 (the upper side in FIG. 4) and the S pole (the other pole) faces the lower side in FIG. 4.

The moving body 200 illustrated in the present example is constituted of three divided pieces 210. The divided pieces 210 are coupled to each other to be angularly displaceable within a predetermined range in the upper-lower direction in FIG. 4 and the depth direction of the plane of the paper centering on the hinge parts 211, respectively. With this configuration, the moving body 200 can smoothly move in the air blowing tube 100 even when the air blowing tube 100 forms the air flow path 101 curved in the upper-lower or right-left direction.

<Relation Between Air Blowing Tube and Moving Body>

The inner surface shape of the moving route part 111 and the outer surface shape of the moving body 200 are formed in such a manner that the moving body 200 does not relatively rotate on a virtual axis extending along the longitudinal direction of the moving route part 111 with respect to the moving route part 111. For example, the horizontal sectional shape (the shape on a cross section orthogonal to the longitudinal direction) of the moving route part 111 and the horizontal sectional shape of the divided pieces 210 of the moving body 200 are respectively formed into rectangular shapes. With provision of the configuration described above, the attitude of the moving body 200 in the moving route part 111 can be maintained to cause the N pole (one of the poles) of each of the moving body magnets 213 to always face the side of the transport tube 400.

<Air-Blow Control Unit>

FIGS. 5(a) to 5(c) are schematic diagrams illustrating a relation between the air blowing tube and the air-blow control unit according to one embodiment of the present invention.

The air-blow control unit 300 according to the present embodiment includes a single blower 310 that generates an air flow flowing in a certain direction, and a switching unit 320 (the switching valve 325) that controls the direction of the air flow in the air blowing tube 100. The air-blow control unit 300 is characterized in switching the direction of the air flow in the air blowing tube 100 between the first direction (the banknote collecting direction and the arrow-B direction) and the second direction (the moving body returning direction and the arrow-C direction) opposite to the first direction using the switching unit 320.

The air-blow control unit (an air flow control apparatus) 300 includes the switching unit (an air flow switching unit) 320 that controls the discharge direction of the air flow, a first circulation pipe 330 that forms an endless air flow path through the switching unit 320, and the blower 310 that is arranged at an appropriate place in the first circulation pipe 330 to generate an air flow flowing in a certain direction inside the first circulation pipe.

The switching unit 320 includes a casing 321 in which four flow paths 323 (a first flow path 323a to a fourth flow path 323d: ports) respectively connecting to external pipes are formed, and the switching valve 325 that is arranged in a joint portion (an intersecting portion) of the four flow paths 323 to switch the communication state among the flow paths 323 and/or the opening degrees at the time of communication. The flow paths 323 are communicated with and connected to an air discharge tube 331, an air intake tube 333, the first air blowing tube 110, and the second air blowing tube 120 that are external pipes, respectively. In the present example, the flow paths 323 are arranged in a cross manner (a radial manner). The switching valve 325 illustrated in the present example is a rotary valve such as a ball valve and the switching valve 325 rotates in the casing 321 by a predetermined angle, whereby the communication states of the flow paths 323 and the opening degrees of the flow paths 323 are switched.

The switching valve 325 is an electric-operated valve and is driven by a motor to control the rotation angle. For example, a stepping motor can be used as the motor. The switching valve 325 is, for example, controlled to have a desired rotation angle by the management unit 800 that controls the rotation angle of the stepping motor on the basis of a drive pulse. Of course, other methods may be used for driving means for rotating the switching valve 325 and control of the rotation angle of the switching valve 325. For example, a configuration in which a rotary encoder that rotates in conjunction with the switching valve 325, and a sensor that detects the rotation angle of the rotary encoder are mounted on the switching unit 320 and in which the management unit 800 executes feedback control of the rotation angle of the switching valve 325 may be adopted.

The first circulation pipe 330 includes the air discharge tube 331 that has one end portion (one end portion 330a of the first circulating pipe 330) communicatively connected to the first flow path 323a of the switching unit 320 and the other end portion communicatively connected to the outlet of the blower 310, and the air intake tube 333 that has one end portion communicatively connected to the inlet of the blower 310 and the other end portion (the other end portion 330b of the first circulation pipe 330) communicatively connected to the second flow path 323b of the switching unit 320.

The air blowing tube (the second circulation pipe) 100 has one end portion 100a communicatively connected to the third flow path 323c of the switching unit 320 and the other end portion 100b communicatively connected to the fourth flow path 323d of the switching unit 320, and forms an endless air flow path through the switching unit 320. The air blowing tube 100 reciprocates the moving body 200 placed therein in the arrow-B direction and the arrow-C direction in FIG. 5 with the air flow.

The air blowing tube 100 according to the present example includes the first air blowing tube 110 forming the moving route part 111 of the moving body 200, and the second air blowing tube 120 communicatively connected to the first air blowing tube 110. The first air blowing tube 110 is communicatively connected to the third flow path 323c and the second air blowing tube 120 is communicatively connected to the fourth flow path 323d.

<<Operation of Switching Unit: Neutral State>>

FIG. 5(a) illustrates a neutral state.

The switching valve 325 is at a neutral position for establishing communication between the first flow path 323a and the second flow path 323b while not establishing communication between the first and second flow paths 323a and 323b and the third and fourth flow paths 323c and 323d.

Accordingly, the air flow circulates in the first circulation pipe 330 in an arrow-A (A1 and A2) direction and no air flow is generated inside the air blowing tube 100. Therefore, the moving body 200 is in a state stopped in the air blowing tube 100.

<<Operation of Switching Unit: First Communication State>>

FIG. 5(b) illustrates a first state in which an air flow flowing in the air blowing tube 100 in the first direction (an arrow-B1 or B2 direction) is generated inside the air blowing tube 100. This state is, for example, a banknote collecting operation state for transporting banknotes collected by the transport body 500 to the safe unit 700.

The switching valve 325 is in a first communication position for establishing communication between the first flow path 323a and the fourth flow path 323d and establishing communication between the second flow path 323b and the third flow path 323c. At this time, the first flow path 323a and the fourth flow path 323d are not communicated with the second flow path 323b and the third flow path 323c.

The air circulates in an endless manner between the first circulation pipe 330 and the air blowing tube 100. That is, air (in the arrow-A1 direction) discharged from the discharge tube 331 to flow in the first flow path 323a flows in the second air blowing tube 120 from the fourth flow path 323d (in the arrow-B1 direction) due to the switching valve 325. Air flowing in the arrow-B2 direction inside the first air blowing tube 110 to flow in the third flow path 323c flows in the intake tube 333 from the second flow path 323b (in the arrow-A2 direction) due to the switching valve 325, returns to the blower 310, and is discharged again from the discharge tube 331.

<<Operation of Switching Unit: Second Communication State>>

FIG. 5(c) illustrates a second state in which an air flow flowing in the second direction (an arrow-C1 or C2 direction) is generated inside the air blowing tube 100. This state is, for example, a return operation state for returning the transport body 500 from the side of the safe unit 700 (the side of the management unit 800) to the distal end side of the transport tube 400.

The switching valve 325 is in a second communication position for establishing communication between the first flow path 323a and the third flow path 323c and establishing communication between the second flow path 323b and the fourth flow path 323d. At this time, the first flow path 323a and the third flow path 323c are not communicated with the second flow path 323b and the fourth flow path 323d.

The air circulates in an endless manner between the first circulation pipe 330 and the air blowing tube 100. That is, air (in the arrow-A1 direction) discharged from the discharge tube 331 to flow in the first flow path 323a flows in the first air blowing tube 110 from the third flow path 323c (the arrow-C1 direction) due to the switching valve 325. Air flowing in the arrow-C2 direction inside the second air blowing tube 120 to flow in the fourth flow path 323d flows in the intake tube 333 from the second flow path 323b (in the arrow-A2 direction) due to the switching valve 325, returns to the blower 310, and is discharged again from the discharge tube 331.

<<Operation of Switching Unit: Summary>>

By connecting two endless pipes (the first circulation pipe 330 and the air blowing tube 100) via the switching unit 320 as described above, three states including the neutral state in which no air flow is generated in the air blowing tube 100, the first communication state in which an air flow flowing in the first direction (the arrow-B direction) is generated inside the air blowing tube 100, and the second communication state in which an air flow flowing in the second direction (the arrow-C direction) is generated inside the air blowing tube 100 can be switched by changing the position of the switching valve 325 while an air flow in a certain direction (the arrow-A direction) is generated by the single blower 310.

In intermediate positions taken by the switching valve 325 among the three states described above, the communication state changes from those in the three states. That is, since the communication relation among the flow paths and the opening degrees of the flow paths can be adjusted according to the angle of the switching valve 325 in the casing 321 in the present embodiment, an air volume of the air flow according to the opening degrees of the flow paths can be generated inside the air blowing tube 100. That is, the speed of the moving body 200 can be varied according to the wind speed in the air blowing tube 100.

The moving speed of the moving body 200 may be adjusted by control of the air volume of the blower 310. For example, the air volume of the blower 310 may be adjusted by varying the rotational speed of blades of the blower 310 by PWM (Pulse Width Modulation) control. However, since the rotation responsiveness of the switching valve 325 is higher than the variation responsiveness of the rotational speed of the blower 310, adjustment of the rotation angle of the switching valve 325 is more advantageous to rapidly adjust the speed of the moving body 200.

<<Transport Tube>>

The transport tube 400 is explained with reference to FIGS. 4 and 6.

Figure 6:
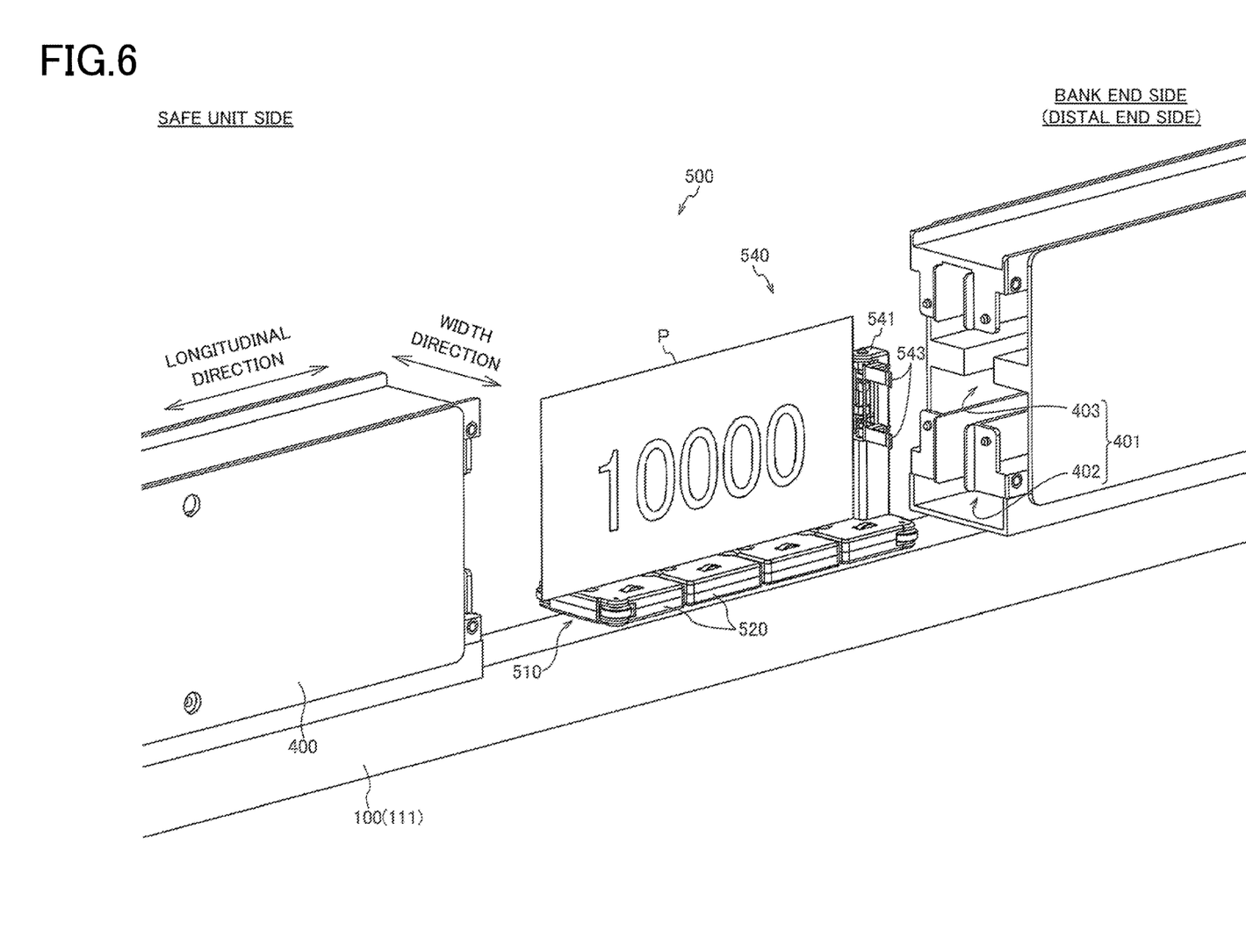
FIG. 6 is a perspective view illustrating a relation between the transport tube and the transport body.

FIG. 6 is a perspective view illustrating a relation between the transport tube and the transport body. FIG. 6 illustrates a state in which the inner part of the transport tube 400 is partially exposed.

Since the transport body 500 is transported with a magnetic force in the banknote transport system 10, the transport tube 400 is formed of a material that does not affect the travel of the transport body 500 based on the magnetic force. Although it is desirable that the transport tube 400 is entirely formed of a non-magnetic material, the transport tube 400 may include a magnetic material in a part thereof without affecting the travel of the transport body 500.

The transport tube 400 includes a configuration (the thickness of the tube, the spacing between the tubes, the shape thereof, and the like) that can apply a magnetic force between the moving body 200 arranged inside the moving route part 111 and the transport body 500 arranged inside the transport tube 400.

Although the transport tube 400 is arranged above the air blowing tube 100 in the present example, the location relation between the air blowing tube 100 and the transport tube 400 is not limited thereto. The transport tube 400 may be arranged below the air blowing tube 100 or the transport tube 400 may be arranged on the lateral side of the air blowing tube 100.

While the transport tube 400 is illustrated as means that constitutes the transport path 401, the means that constitutes the transport path 401 does not need to be tubular and the present invention can be achieved even with a configuration in which a part or the whole of the transport path 401 is open to outside.

<Transport Body>

As illustrated in FIGS. 4 and 6, the transport body 500 includes a transport base 510 that is arranged on the side nearer the air blowing tube 100 and that is subjected to a magnetic force from the moving body 200, and a banknote retaining part 540 provided on the opposite side of the transport base 510 to the air blowing tube 100.

<<Transport Base>>

The transport base 510 has a configuration in which a plurality of divided pieces 520, 520, are sequentially coupled to each other with hinge parts 521 along the travel direction of the transport body 500 (the longitudinal direction of the transport tube 400). Each of the divided pieces 520 illustrated in the present example includes the transport body magnet 523.

The transport base 510 includes the transport body magnets 523 arranged at locations, in attitudes, and in shapes that can be subjected to the effect of the magnetic force from the moving body 200. In the present example, the transport body magnets 523 are arranged on the side of the transport base 510 nearer the air blowing tube 100. The transport body magnets 523 included in the transport base 510 are arranged spaced apart from each other in the travel direction of the transport body 500. In the present example, each of the transport body magnets 523 is attached to the associated divided piece 520 in such a manner that the N pole (one of the poles) faces the side of the air blowing tube 100 (the lower side in FIGS. 4 and 6) and the S pole (the other pole)

faces the upper side in FIGS. 4 and 6. The transport base 510 magnetically levitates in the transport tube 400 under a repelling force due to the magnetic force from the moving body 200.

The transport base 510 illustrated in the present example is constituted of four divided pieces 520. The divided pieces 520 are coupled to each other to be angularly displaceable within a predetermined range in the upper-lower direction in FIGS. 4 and 6 and the depth direction of the plane of paper on the hinge parts 521, respectively. With the configuration described above, the transport body 500 can smoothly move in the transport tube 400 even when the transport tube 400 forms the transport path 401 curved in the upper-lower or right-left direction.

<<Banknote Retaining Part>>

The banknote retaining part 540 is formed on the transport base 510. The banknote retaining part 540 includes a support member 541 that is upright in a direction away from the air blowing tube 100, and a support arm 543 that is protruded from the support member 541 in the width direction at an end portion on the bank end side in the longitudinal direction of the transport tube 400 (on the distal end side with respect to the safe unit 700). The support member 541 is protruded from a middle portion of the transport base 510 in the width direction.

The banknote retaining part 540 retains banknotes P to cause the long edge direction of the banknotes P to follow the longitudinal direction of the transport tube 400 and in an upright attitude. One of long sides (a long side positioned on the lower side in FIG. 6) of the banknote P is supported by the transport base 510. The rear end edge (one of short sides) of the banknote is supported by the support member 541 or the support arm 543.

<Relation Between Transport Tube and Transport Body>

The transport tube 400 includes therein a base transport path 402 arranged on the side nearer the air blowing tube 100, and a banknote transport path 403 arranged on the opposite side to the air blowing tube 100. The base transport path 402 is a space where the transport base 510 of the transport body 500 travels, and the banknote transport path 403 is a space where the banknote retaining part 540 of the transport body 500 and banknotes retained by the banknote retaining part 540 travel.

Since the transport body 500 illustrated in the present example travels while being subjected to a repelling force due to a magnetic force from the moving body 200, the base transport path 402 and the transport base 510 are configured to inhibit separation (movement toward the banknote transport path 403) of the transport base 510 from the base transport path 402 and maintain the transport base 510 at a location where the effect of the magnetic force can be received from the moving body 200.

The inner surface shape of the base transport path 402 and the outer surface shape of the transport base 510 are formed in such a manner that the transport base 510 does not relatively rotate on a virtual axis extending along the longitudinal direction of the base transport path 402 with respect to the base transport path 402. For example, the horizontal sectional shape of the base transport path 402 and the horizontal sectional shape of the transport base 510 are formed in rectangular shapes. With provision of the configuration described above, the attitude of the moving body 200 in the base transport path 402 is maintained to cause the N pole (one of the poles) of each of the transport body magnets 523 to always face the side of the air blowing tube 100.

<Relation Between Moving Body and Transport Body>

A relation between the moving body magnetic material and the transport body magnetic material is explained.

<<Only Repulsion>>

As illustrated in FIG. 4, one or more magnets can be arranged in both the moving body 200 and the transport body 500 in directions repelling each other to apply only the repelling force between the moving body 200 and the transport body 500. When only the repelling force is to be applied between the moving body 200 and the transport body 500, it is desirable that a plurality of magnets are arranged on at least one of the moving body 200 and the transport body 500 at a predetermined interval in the travel direction. With arrangement of the magnets in the travel direction on at least one of the moving body 200 and the transport body 500, the moving body magnets 213 and the transport body magnets 523 are alternately arrayed when the moving body 500 travels while being subjected to the repelling force from the moving body 200. That is, when the transport body 500 travels, the transport body 500 is relatively positioned with respect to the moving body 200. In this case, it is particularly preferable that the difference between the number of magnets included in the moving body 200 and the number of magnets included in the transport body 500 is one. In other words, when n is a natural number, it is preferable that n magnets are arranged on one of the moving body 200 and the transport body 500 and that n+1 magnets are arranged on the other one.

When the transport tube 400 is placed above the air blowing tube 100 and a repelling force is applied between the transport body 500 and the moving body 200, the transport body 500 levitates in the transport tube 400 and therefore the transport body 500 is less likely to be in contact with the transport tube 400. Therefore, it is possible to prevent reduction in the transport force of the transport body 500 due to friction with the transport tube 400 and smoothly move the transport body 500. Since the contact between the transport body 500 and the transport tube 400 is suppressed, generation of fine dust (powdery dust) due to contact between members can be prevented.

When the repelling force is applied between the moving body 200 and the transport body 500, the transport force can be increased by increasing the number of magnets included in the moving body 200 and the transport body 500.

<<Only Attraction>>

Figure 7:
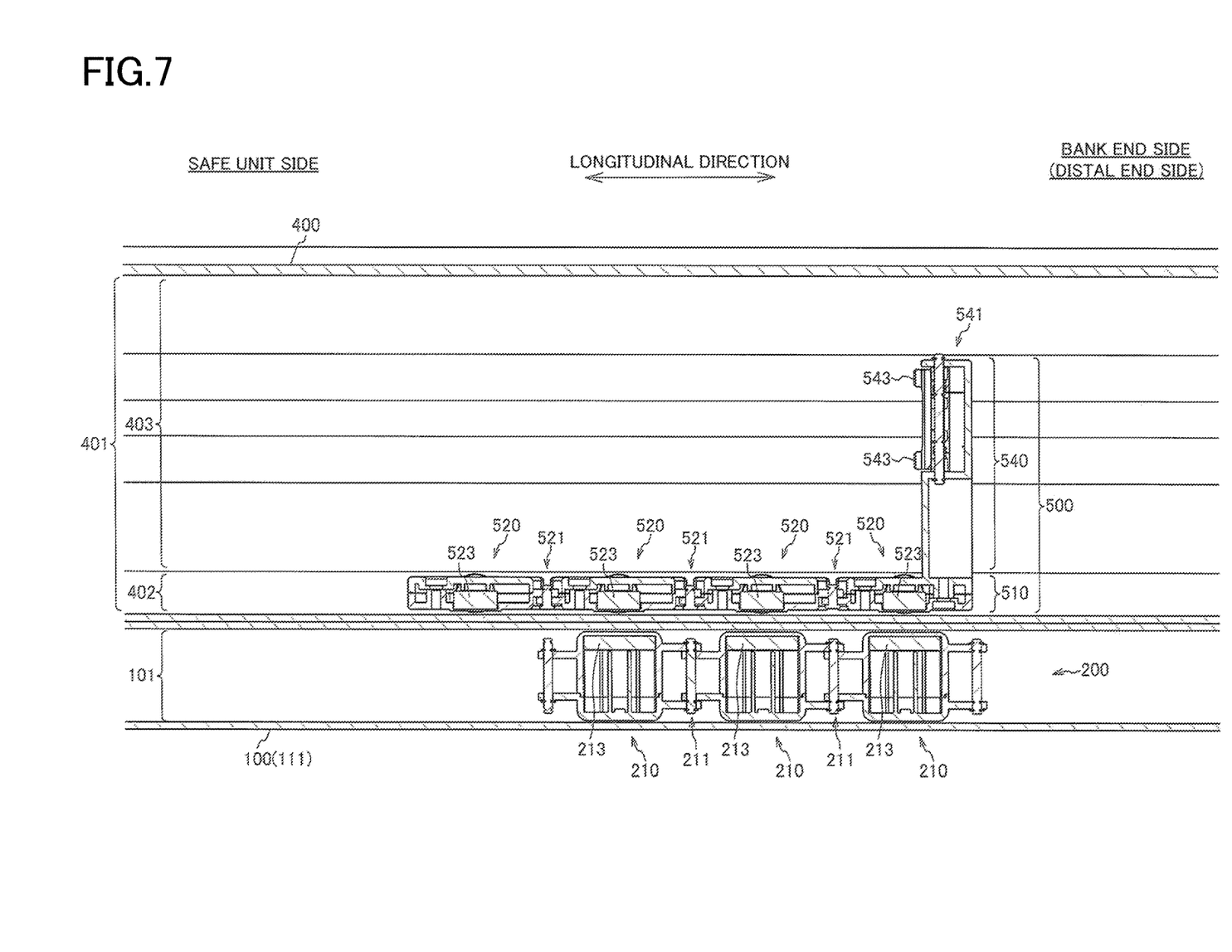
FIG. 7 is a vertical sectional view of the moving body, the air blowing tube including the moving body, the transport body, and the transport tube including the transport body in a case in which the moving body and the transport body attract each other due to a magnetic force.

FIG. 7 is a vertical sectional view of the air blowing tube and the transport tube including the moving body and the transport body in a case in which the moving body and the transport body attract each other due to a magnetic force.

In an illustrated example, the moving body magnets 213 and the transport body magnets 523 are respectively attached to the moving body 200 and the transport body 500 in attitudes attracting each other. Since the locations in the longitudinal direction of the moving body magnets 213 and the transport body magnets 523 match with walls of the air blowing tube 100 and the transport tube 400 interposed therebetween, positioning of the transport body 500 with respect to the moving body 200 is easy.

When only the attracting force based on the magnetic force is to be applied between the moving body 200 and the transport body 500, it suffices that at least either the magnetic material mounted on the moving body 200 or the magnetic material mounted on the transport body 500 is a magnet. For example, magnets may be arranged on one of the transport body 500 and the moving body 200 and a magnetic material (for example, iron plates), other than magnets, that is attracted by magnets may be arranged on the other one.

When only the attracting force based on the magnetic force is to be applied between the moving body 200 and the transport body 500, it suffices that at least one set of magnetic materials (for example, a set of a magnet and a magnet or a set of a magnet and an iron plate) is arranged on the transport body 500 and the moving body 200.

<<Repulsion and Attraction>>

Both the repelling force and the attracting force may be applied between the moving body 200 and the transport body 500. That is, a set of magnets that apply a repelling force to each other, and a set of magnets that apply an attracting force to each other may be mixed on the moving body 200 and the transport body 500. An example in which both the repelling force and the attracting force are applied will be described later with reference to FIG. 8.

<<Orientation of Magnets>>

While the poles of each of the magnets are arranged to face in the upper-lower direction (a staking direction of the air blowing tube 100 and the transport tube 400) in the embodiment described above, the poles of each of the magnets may be arranged to face in the travel direction (for example, to cause the N pole to face toward the safe unit and the S pole to face toward the bank end side/the distal end side). Alternatively, the poles of each of the magnets may be arranged diagonally to the travel direction. The action of the magnetic force can be appropriately adjusted according to the orientation of the magnets.

<<Orientation of Magnets: Arrangement in Tandem>>

Figure 8:
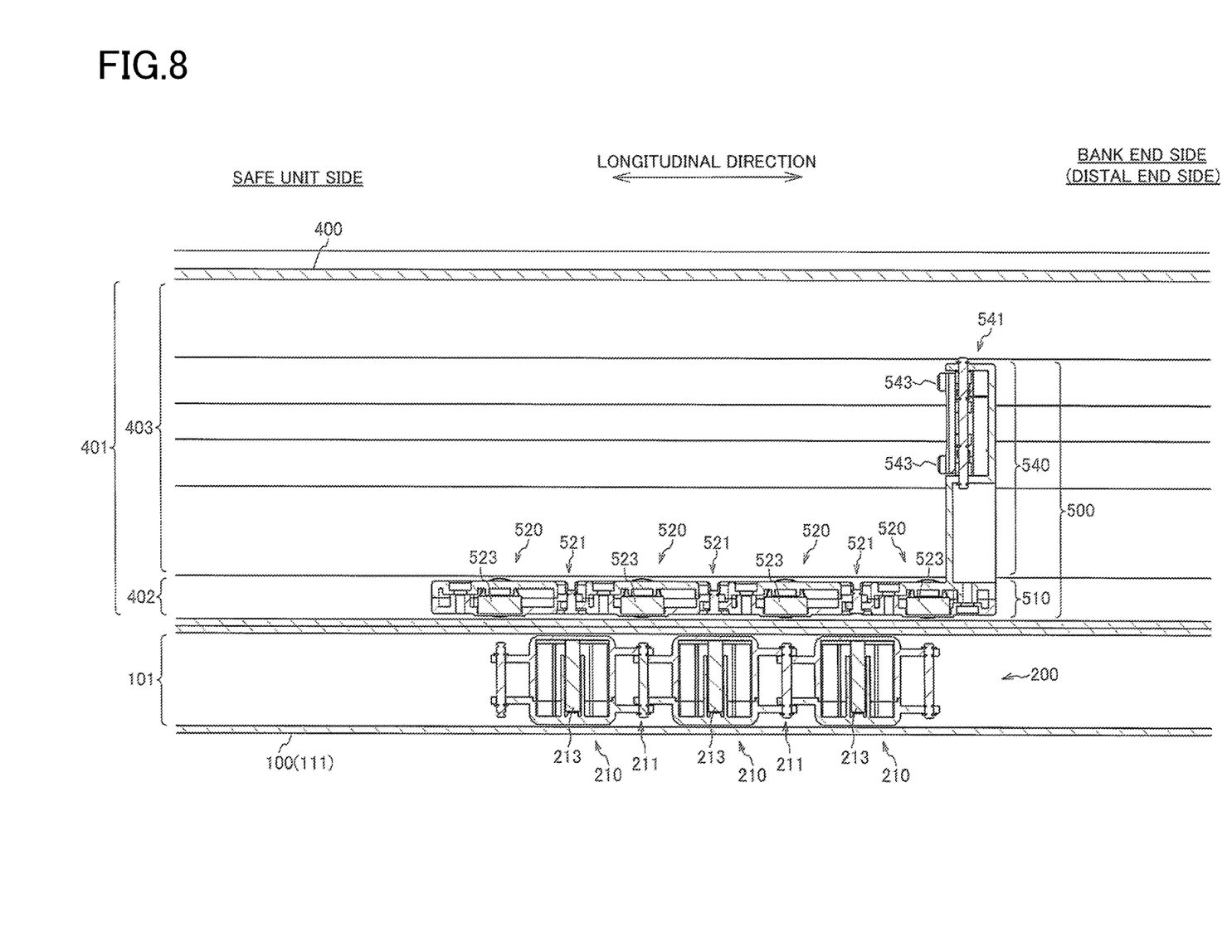
FIG. 8 is a vertical sectional view of the air blowing tube and the transport tube including the moving body and the transport body in a case in which the poles of each of moving body magnets are arranged to face in a travel direction.

FIG. 8 is a vertical sectional view of the air blowing tube and the transport tube including the moving body and the transport body in a case in which the poles of each of the moving body magnets are arranged to face in the travel direction.

In an illustrated example, each of the moving body magnets 213 is attached to the associated divided piece 210 in such a manner that the N pole (one of the poles) faces the side of the safe unit (the left side in FIG. 8) and the S pole (the other pole) faces the distal end side (the right side in FIG. 8). Each of the transport body magnets 523 is attached to the associated divided piece 520 in such a manner that the N pole faces the side of the air blowing tube 100 and the S pole faces the upper side in FIG. 8.

Since surfaces (the N poles) on the safe unit side of the moving body magnets 213 respectively repel the transport body magnets 523 (the N poles), and the surfaces (the S poles) on the distal end side of the moving body magnets 213 respectively attract the transport body magnets 523 (the N poles), both the repelling force and the attracting force can be applied between the moving body 200 and the transport body 500.

[First Modified Embodiment Related to Air Blow Control]

Figure 9:
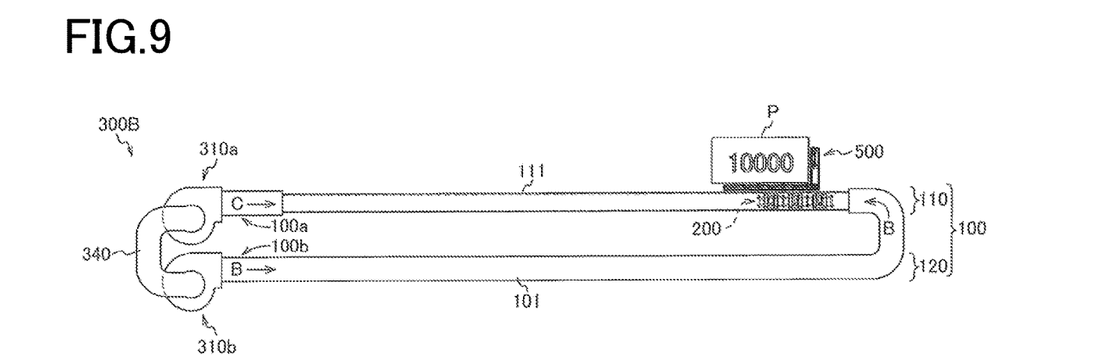
FIG. 9 is a diagram illustrating a first modification of an air-blow control unit.

FIG. 9 is a diagram illustrating a first modification of the air-blow control unit.

An air-blow control unit 300B may have a configuration including a blower 310a having an outlet connected to one end portion 100a of the air blowing tube 100, a blower 310b having an outlet connected to the other end portion 100b of the air blowing tube 100, and a connection pipe 340 that connects the inlets of the blowers 310a and 310b to each other. The air blowing tube 100 (the first air blowing tube 110 and the second air blowing tube 120) is configured in an endless manner through the two blowers 310a and 310b and the connection pipe 340.

Turning on/off of the blowers 310a and 310b and the air volume thereof are controlled by the management unit 800.

When an air flow flowing in a first direction (an arrow-B direction) is to be generated inside the air blowing tube 100 (the first state and the banknote collecting operation state), one blower 310b is turned on to generate an air flow and the other blower 310a is turned off. Air flowing inside the air blowing tube 100 flows in the outlet of the blower 310a and is discharged from the inlet of the blower 310a. The air further passes through the connection pipe 340 to return to the inlet of the blower 310b and is discharged from the outlet of the blower 310b.

When an air flow flowing in a second direction (an arrow-C direction) is to be generated inside the air blowing tube 100 (the second state and the transport body returning state), it suffices to turn one blower 310b off and turn the other blower 310a on to generate the air flow.

In this way, the use of two blowers also enables the air flow in the first direction and the air flow in the second direction to be generated inside the air blowing tube 100.

Since the inlets of the two blowers 310a and 310b are connected with the connection pipe 340 in the present example, air can be efficiently circulated inside the air flow path 101 airtightly configured.

[Second Modified Embodiment Related to Air Blow Control]

Figure 10:
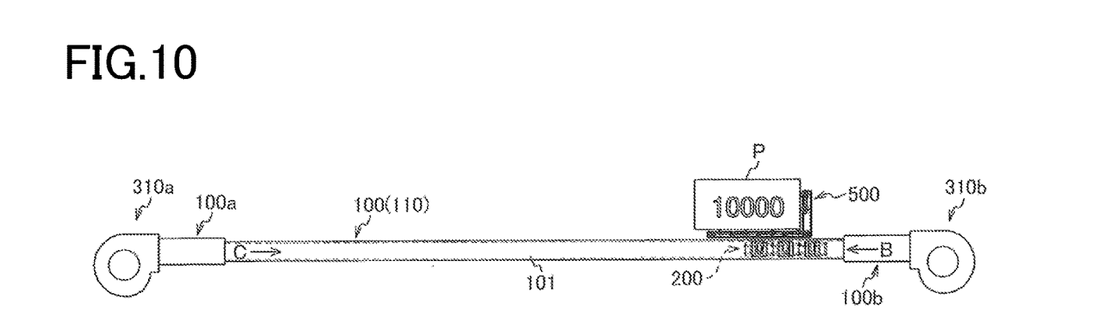
FIG. 10 is a diagram illustrating a second modification of the air-blow control unit.

FIG. 10 is a diagram illustrating a second modification of the air-blow control unit.

An air-blow control unit 300C may have a configuration including the blowers 310a and 310b at one end portion 100a and the other end portion 100b of the air blowing tube 100, respectively. Turning-on/off of the blowers 310a and 310b and the air volume thereof are controlled by the management unit 800.

When an air flow flowing in a first direction (an arrow-B direction) is to be generated inside the air blowing tube 100 (the first state and the banknote collecting operation state), one blower 310b is turned on to generate an air flow and the other blower 310a is turned off. The blower 310b takes external air to the inside from the inlet and discharges the air, thereby generating the air flow in the arrow-B direction inside the air blowing tube 100. This air flow is taken into the blower 310a from the outlet of the blower 310a and is discharged from the inlet.

When an air flow flowing in a second direction (an arrow-C direction) is to be generated inside the air blowing tube 100 (the second state and the transport body returning state), it suffices to turn one blower 310b off and turn the other blower 310a on to generate the air flow.

Since the present example does not require pipes for causing the air flow path 101 to be a circulation path, the configuration is simplified.

Aspects of Present Invention and Summary of Actions and Effects of Present Invention First Aspect A paper sheet transport mechanism (a banknote transport system 10) according to the present aspect includes: an air blowing tube 100 that forms a flow path (an air flow path 101) of a gas; a moving body 200 that travels inside the air blowing tube while receiving an air flow flowing in a predetermined direction (an arrow-B or C direction) within the air blowing tube; a transport path 401 (a transport tube 400) having at least a portion arranged along the air blowing tube to be adjacent to the air blowing tube; and a transport body 500 configured to be able to retain a paper sheet (a banknote P) and traveling inside the transport path. The moving body includes a moving body magnetic material (a moving body magnet 213), the transport body includes a transport body magnetic material (a transport body magnet 523), and at least one of the moving body magnetic material and the transport body magnetic material is constituted of a magnet. The paper sheet transport mechanism is characterized in moving the transport body in conjunction with movement of the moving body receiving the air flow due to attraction and/or repulsion based on a magnetic force applied between the moving body magnetic material and the transport body magnetic material.

In the present aspect, the moving body is caused to travel with the air flow and the transport body is caused to travel with a magnetic force in conjunction with movement of the moving body. Since no mechanical driving means such as a motor, a gear, a transport belt are required to cause the moving body and the transport body to travel, the durability of members constituting the transport mechanism can be increased and the running cost of the transport mechanism can be reduced.

When a repelling force is to be applied between the transport body magnetic material and the moving body magnetic material, the transport body is less likely to be in contact with the transport path. As a result, reduction of the transport force due to generation of a frictional force or generation of dust due to contact of the members can be prevented.

Since the air blowing tube and the transport path are configured as separate and independent configurations in the present aspect, an airtight flow path can be formed in the air blowing tube. Air leakage to outside the air blowing tube can be prevented and reduction in the transport force can be therefore prevented. An air flow generating device (the blower 310) that is relatively inexpensive and outputs low power can be adopted as a device that generates an air flow inside the air blowing tube and reduction in the cost of the transport mechanism is realized. Control of the air flow in the airtight air blowing tube is easy even when the transport distance of paper sheets is increased.

Second Aspect

An air flow control apparatus (an air-blow control unit 300) according to the present aspect includes: an air flow switching unit 320 that includes first to fourth flow paths (323*a* to 323*d*) respectively connecting to external pipes, and a switching valve 325 arranged in a joint portion of the first to fourth flow paths and switching a communication state among the flow paths; a first circulation pipe 330 that has one end portion 330*a* communicatively connected to the first flow path 323*a* and the other end portion 330*b* communicatively connected to the second flow path 323*b* to form an air flow path in an endless manner through the air flow switching unit; an air flow generating device (a blower 310) that is arranged at an appropriate place in the first circulation pipe and that generates an air flow flowing in a certain direction inside the first circulation pipe; and a second circulation pipe (the air blowing tube 100) that has one end portion 100*a* connected to the third flow path 323*c* and the other end portion 100*b* connected to the fourth flow path 323*d* to form an air flow path in an endless manner through the air flow switching unit and that moves the moving body 200 arranged therein in a predetermined direction with the air flow.

Figure 5:
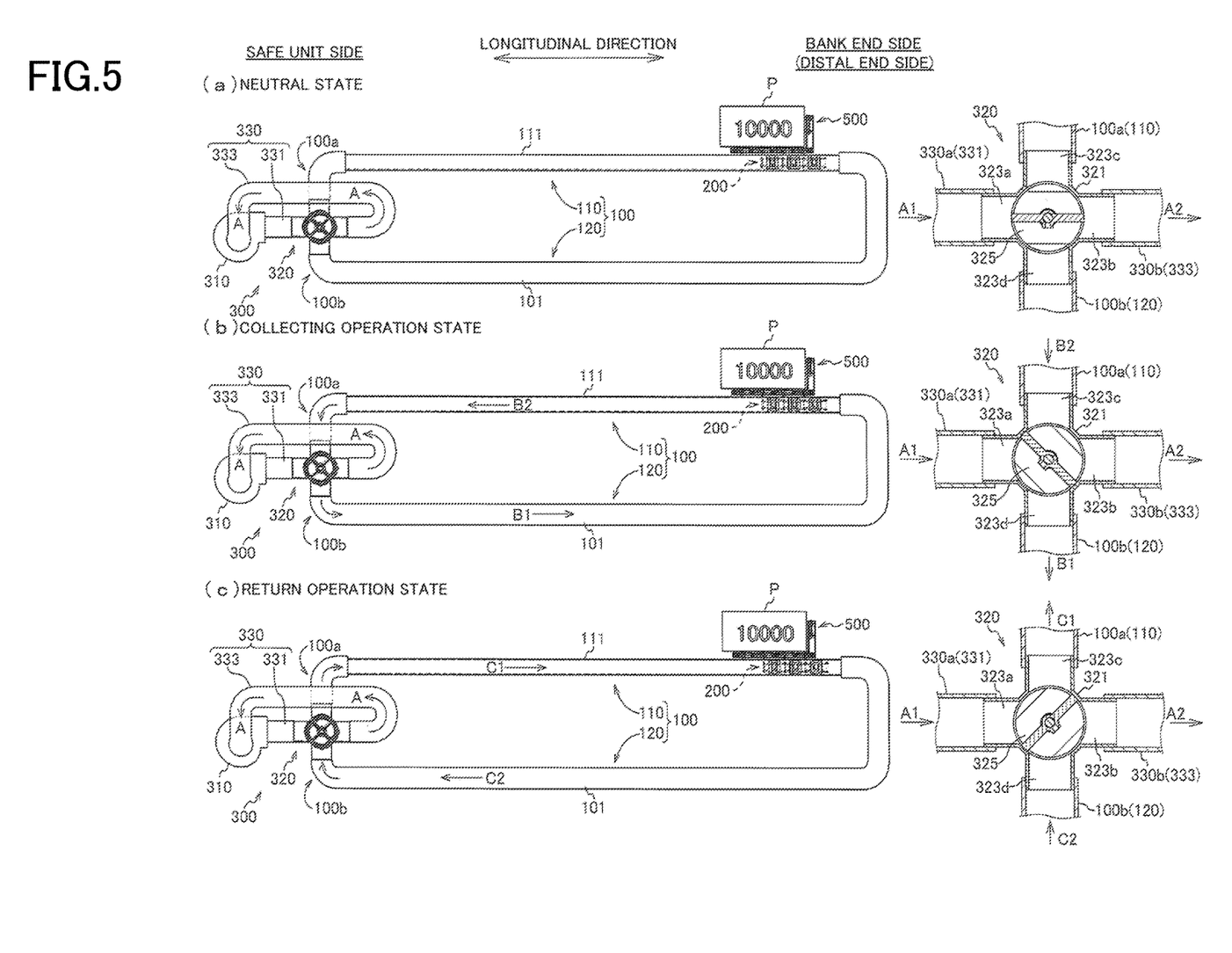
FIGS. 5(a) to 5(c) are schematic diagrams illustrating a relation between the air blowing tube and an air-blow control unit according to one embodiment of the present invention.

The switching valve is characterized in being configured to be able to switch among a neutral position (FIG. 5(*a*)) for establishing communication between the first and second flow paths, a first communication position (FIG. 5(*b*)) for generating an air flow flowing in a first direction inside the second circulation pipe by establishing communication between the first and fourth flow paths and communication between the second and third flow paths, and a second communication position (FIG. 5(*c*)) for generating an air flow flowing in a second direction inside the second circulation pipe by establishing communication between the first and third flow paths and communication between the second and fourth flow paths.

According to the present aspect, while an air flow in a certain direction (an arrow-A direction) is generated by a single air flow generating device, three states including a state in which no air flow is generated inside the air blowing tube, a state in which an air flow flowing in a first direction (an arrow-B direction) is generated inside the air blowing tube, and a state in which an air flow flowing in a second direction (an arrow-C direction) is generated inside the air blowing tube can be switched by changing the position of the switching valve.

REFERENCE SIGNS LIST

L bank facility, P banknote (object to be transported, paper sheet), 1 game machine, 2 sandwiched machine, 10 banknote transport system (transport mechanism for transporting objects to be transported such as paper sheet), 100 air blowing tube (second circulation pipe), 100*a* one end portion, 100*b* other end portion, 101 air flow path, 110 first air blowing tube, 111 moving route part, 120 second air blowing tube, 200 moving body, 210 divided piece, 211 hinge part, 213 moving body magnet (moving body magnetic material), 300 air-blow control unit (air flow control apparatus), 310 blower (air flow generating device), 320 switching unit, 321 casing, 323 flow path, 325 switching valve, 330 first circulation pipe, 330*a* one end portion, 330*b* other end portion, 331 discharge tube, 333 intake tube, 340 connection pipe, 400 transport tube, 401 transport path, 402 base transport path, 403 banknote transport path, 500 transport body, 510 transport base, 520 divided piece, 521 hinge part, 523 transport body magnet (transport body magnet material), 540 banknote retaining part, 541 support member, 543 support arm, 600 receiving unit, 700 safe unit, 800 management unit, 801 body.

The invention claimed is:

1. An air flow control apparatus comprising:
   an air flow switching unit that includes first to fourth flow paths respectively connecting to external pipes, and a switching valve arranged in a joint portion of the first to fourth flow paths and switching a communication state among the flow paths;
   a first circulation pipe that has one end portion communicatively connected to the first flow path and an other end portion communicatively connected to the second flow path to form an air flow path in an endless manner through the air flow switching unit;
   an air flow generating device that is arranged at an appropriate place in the first circulation pipe and that generates an air flow flowing in a certain direction inside the first circulation pipe; and
   a second circulation pipe that has one end portion connected to the third flow path and an other end portion connected to the fourth flow path to form an air flow path in an endless manner through the air flow switching unit and that moves a moving body arranged therein in a predetermined direction with an air flow, wherein
   the switching valve is configured to be able to switch among a neutral position for establishing communication between the first and second flow paths, a first communication position for generating an air flow flowing in a first direction inside the second circulation pipe by establishing communication between the first and fourth flow paths and communication between the second and third flow paths, and a second communication position for generating an air flow flowing in a second direction inside the second circulation pipe by establishing communication between the first and third flow paths and communication between the second and fourth flow paths.

2. A transport mechanism comprising:

an air blowing tube that forms a flow path of a gas;

a moving body that travels inside the air blowing tube while receiving an air flow flowing in a predetermined direction within the air blowing tube;

a transport path having at least a portion arranged along the air blowing tube to be adjacent to the air blowing tube; and a transport body configured to be able to retain an object to be transported and traveling inside the transport path, wherein the moving body includes a plurality of a moving body magnets spaced apart in a travel direction, the transport body includes a plurality of a transport body magnets spaced apart in a travel direction, and the transport body is moved in conjunction with movement of the moving body receiving the air flow due to repelling force based on a magnetic force applied between the moving body magnet and the transport body magnet, and when the moving body and the transport body travel in tandem, the transport body magnet is positioned between the two moving body magnets that are separated in the travel direction, and the moving body magnet is positioned between the two transport body magnets that are separated in the travel direction.

3. The transport mechanism according to claim 2, wherein the moving body magnet and the transport body magnet are mounted on the moving body and the transport body so that magnetic poles repelling each other face each other and magnetic poles adsorbing each other do not face each other.

4. A transport mechanism comprising:

an air blowing tube that forms a flow path of a gas;

a moving body that travels inside the air blowing tube while receiving an air flow flowing in a predetermined direction within the air blowing tube;

a transport path having at least a portion arranged along the air blowing tube to be adjacent to the air blowing tube; and a transport body configured to be able to retain an object to be transported and traveling inside the transport path, wherein the moving body includes a moving body magnet, the transport body includes a transport body magnet, and the transport body is moved in conjunction with movement of the moving body receiving the air flow due to repelling force based on a magnetic force applied between the moving body magnet and the transport body magnet, wherein the transport body includes a plurality of transport body divided pieces sequentially coupled to each other with hinge parts along a travel direction, and each transport body magnet is mounted on each of the transport body divided pieces, and each of the transport body divided pieces is configured to be able to support the object to be transported.

5. The transport mechanism according to claim 4, wherein the moving body includes a plurality of moving body divided pieces sequentially coupled to each other with hinge parts along a travel direction, and each moving body magnet is mounted on each of the moving body divided pieces, and when the moving body and the transport body travel in tandem, the transport body magnet is positioned between the two moving body magnets that are separated in the travel direction, and the moving body magnet is positioned between the two transport body magnets that are separated in the travel direction.

6. The transport mechanism according to claim 5, wherein the moving body magnet and the transport body magnet are mounted on the moving body and the transport body so that magnetic poles repelling each other face each other and magnetic poles adsorbing each other do not face each other.

7. The transport mechanism according to claim 4, wherein the moving body magnet and the transport body magnet are mounted on the moving body and the transport body so that magnetic poles repelling each other face each other and magnetic poles adsorbing each other do not face each other.

* * * * *